United States Patent [19]

Liposky

[11] Patent Number: 5,568,749
[45] Date of Patent: Oct. 29, 1996

[54] AUTOMOTIVE ACCELERATOR RETURN SPRING DAMPER

[75] Inventor: Lawrence J. Liposky, Allen Park, Mich.

[73] Assignee: Ford Motor Company, Dearborn, Mich.

[21] Appl. No.: 417,558

[22] Filed: Apr. 6, 1995

[51] Int. Cl.⁶ .............................. F16F 13/04; F02D 11/04
[52] U.S. Cl. .............................. 74/513; 267/287; 123/400
[58] Field of Search .............................. 74/513; 267/33, 267/169, 287; 123/342, 400, 403; 403/225, 228

[56] References Cited

U.S. PATENT DOCUMENTS

| | | | |
|---|---|---|---|
| 2,136,908 | 9/1936 | Pierce et al. | 267/204 |
| 2,998,242 | 5/1959 | Schwarzbeck et al. | 267/204 |
| 3,063,526 | 10/1959 | Griffen | 74/513 |
| 3,166,950 | 2/1962 | Pomeranz | 74/513 |
| 3,186,701 | 3/1963 | Skinner, Sr. | |
| 3,398,817 | 5/1966 | Shinga | 74/513 |
| 4,732,372 | 3/1988 | Dickhart, III et al. | 267/204 |
| 4,881,503 | 11/1989 | Andreasen | 123/400 |
| 4,979,478 | 12/1990 | Sheppard | 123/400 |
| 5,062,507 | 11/1991 | Roche | 267/33 |
| 5,191,866 | 3/1993 | Tosdale | 123/400 |
| 5,299,786 | 4/1994 | Godin | 267/33 |

FOREIGN PATENT DOCUMENTS

| | | | |
|---|---|---|---|
| 574650A1 | 12/1993 | European Pat. Off. | 267/167 |
| 404171327A | 6/1992 | Japan | 267/169 |
| 2205626 | 12/1988 | United Kingdom | 267/287 |

Primary Examiner—Charles A. Marmor
Assistant Examiner—Mary Ann Battista
Attorney, Agent, or Firm—David B. Kelley

[57] ABSTRACT

An automotive accelerator return spring assembly has a tension coil spring with a variable diameter internal damper therein. The damper clips to the spring on one end and has tangentially spaced, flexible fingers on the other end for absorbing vibrational energy.

10 Claims, 3 Drawing Sheets

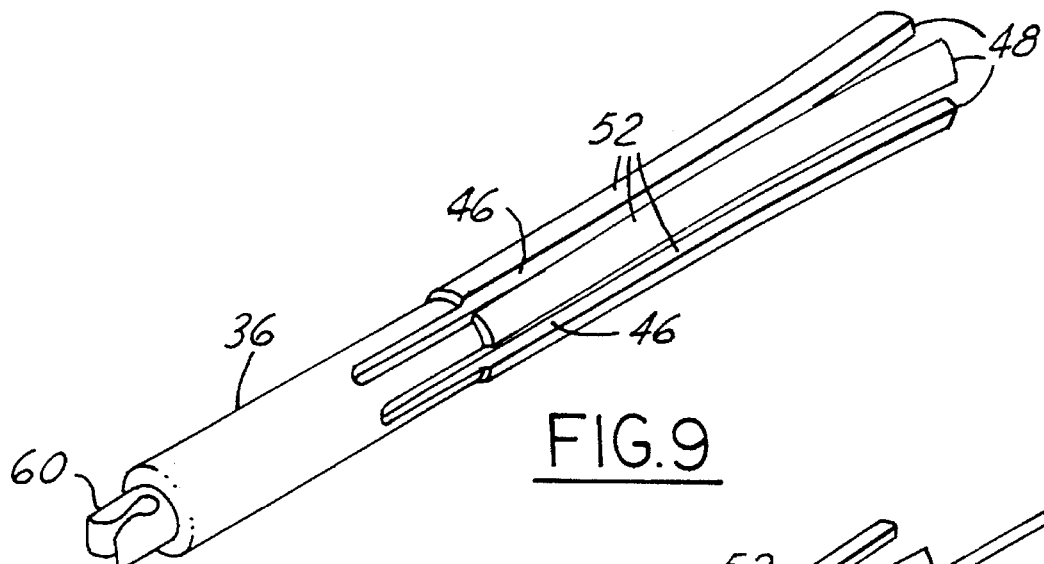
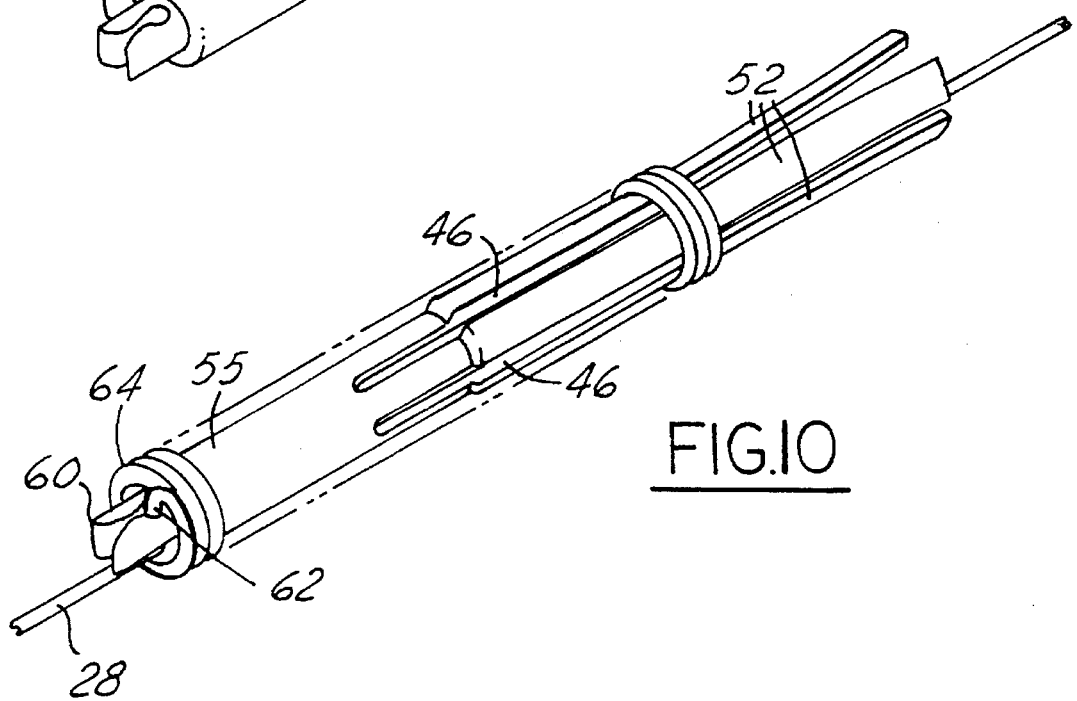

5,568,749

AUTOMOTIVE ACCELERATOR RETURN SPRING DAMPER

FIELD OF THE INVENTION

The present invention relates to an automotive return spring for an internal combustion engine, and, more particularly, to a damper for reducing vibration of the return spring.

BACKGROUND OF THE INVENTION

Accelerator return springs are well known in automotive internal combustion engine applications for biasing a throttle valve to a predetermined position, typically a closed or idle position. The return springs, which can be either single or dual wound, are usually a coil-type tension spring attached to a throttle cam on one end and to the engine block on the other.

During engine operations, the internal combustion cycle produces vibrations which may excite the natural frequency of the return spring. When that occurs, the vibrational energy in the spring may be transferred through the accelerator cable to the accelerator pedal resulting in a phenomenon known as "pedal buzz". Pedal buzz can annoy a vehicle driver and thus poses a concern for automotive engineers and designers.

One approach to the problem is to enclose the return spring 102 with an external damper 104, such as that shown in FIG. 8. An external damper, however, typically does not fit tightly to the spring for adequate damping. In addition, the external damper may vibrate at its own natural frequency, potentially compounding the pedal buzz problem.

Another approach adds mass to the return spring assembly to shift the natural frequency beyond the range normally encountered during engine operation. Increased mass, however, has the disadvantages of decreasing fuel economy and increasing component cost.

SUMMARY OF THE INVENTION

The present invention provides a damper which overcomes the disadvantages of prior dampers with a variable diameter damper mounted internally within the accelerator return spring. The return spring assembly comprises a tension coil spring having a first end attached to a throttle cam of the throttle valve and a second end attached to the engine, the coil spring defining an internal space therewithin, and a generally cylindrical damping member friction-fit within the internal space of the coil spring for damping vibrations thereof. The damping member has at least one small section with an outer diameter less than the inner diameter of the coil spring and at least one large section with an outer diameter greater than the inner diameter of the coil spring.

In a preferred embodiment, the damping member has at least one longitudinally extending slit so that the damping member may expand or compress to fit the inner diameter of the coil spring. Preferably, the damping member has four longitudinally extending slits defining four tangentially spaced fingers which compress radially inward upon insertion into the internal space of the spring to form a friction-fit therewith and to provide a flexible, energy absorbing means therewithin.

Therefore, one advantage of the present invention is an internal return spring damper which can compress or expand to fit the inner diameter of the return spring.

Another advantage is a damper that is lightweight yet effective in reducing the pedal buzz phenomenon.

Still another advantage of the present invention is a damper which can be made economically and assembled easily.

Yet another advantage is reduction of noise transmission into the passenger compartment.

A feature of the present invention is a damper with flexible finger members on one end thereof to provide a variable outer diameter and to absorb energy from the return spring.

Another feature is a damper having one end with an outer diameter smaller than the inner diameter of the return spring to facilitate insertion of the damper therein.

Yet another feature is a clip integral with the damper for attachment to the return spring.

BRIEF DESCRIPTION OF THE DRAWINGS

These and other objects, advantages and features of the present invention will be apparent to those skilled in the automotive engine arts upon reading the following description with reference to the accompanying drawings, in which:

FIG. 9 is a perspective view of a spring damper according to the present invention; and FIG. 10 is a perspective view of a return spring assembly according to the present invention.

DETAILED DESCRIPTION OF A PREFERRED EMBODIMENT

Figure 1:
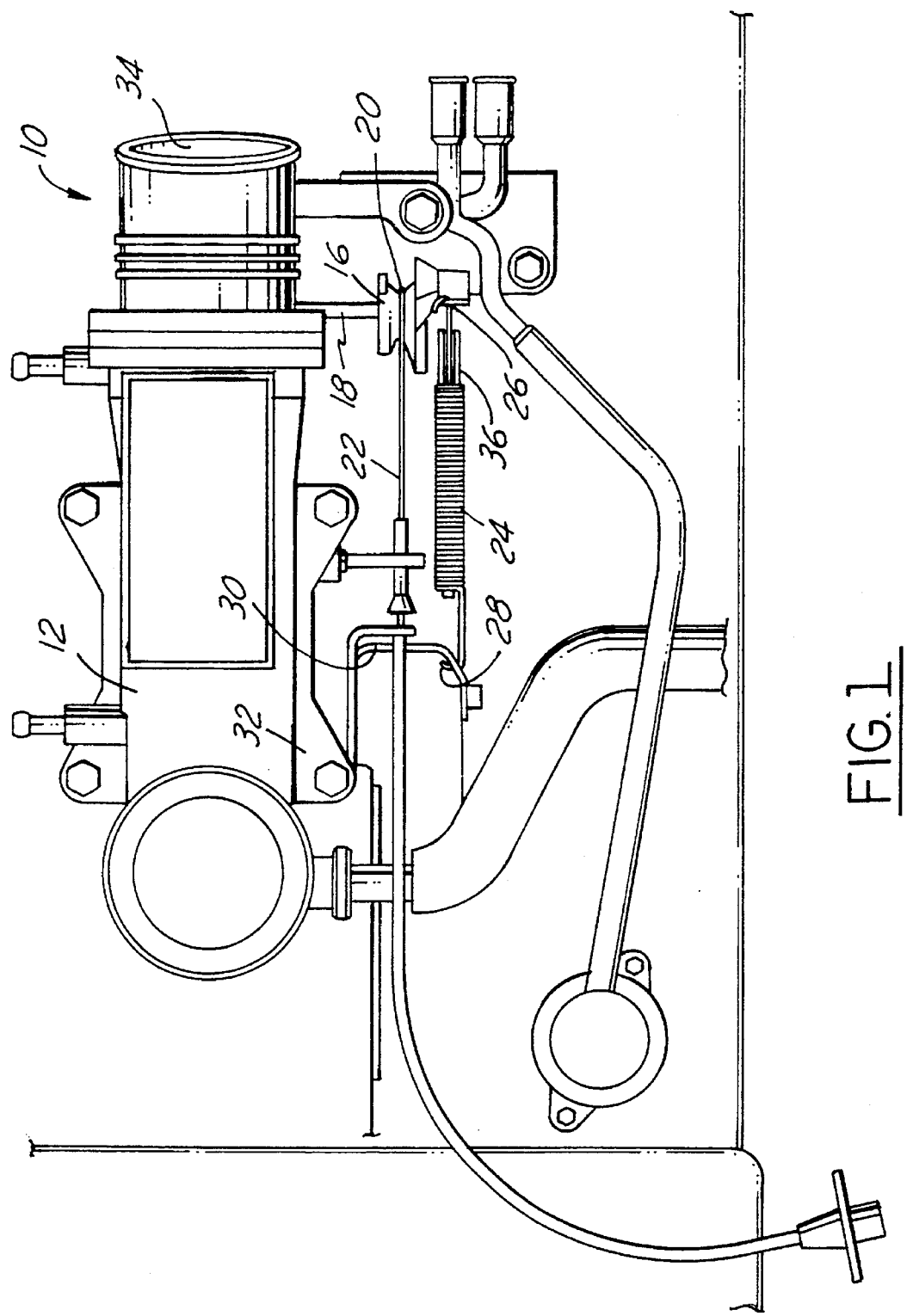
FIG. 1 is a top view of a throttle body section of an internal combustion engine having an accelerator cable return spring with an internal damper according to the preferred embodiment of the present invention mounted therein.

Referring now to the drawings, and in particular to FIG. 1 thereof, an automotive throttle valve 10 is shown connected to an intake manifold 12 of an internal combustion engine. A throttle cam 16 mounted on a shaft 18 controls the position of a throttle plate (not shown) within the throttle valve 10 to regulate airflow therethrough. One end 20 of an accelerator cable 22 is attached to the throttle cam 16, while the other end (not shown) is connected to an accelerator pedal (not shown) within the passenger compartment. A coil tension spring 24 has one end 26 attached to the throttle cam 16 and the other end 28 attached to a point fixed relative thereto, such as a bracket 30 connected to the engine block 32. The spring 24 biases the throttle cam 16 to a predetermined position, which in turn positions the throttle plate to obstruct the throttle valve bore 34, so that the engine is in an idle or low speed condition. As is well known in automotive design, such an arrangement allows a vehicle operator to vary airflow through the throttle valve 10 by changing accelerator pedal position, which in turn rotates the throttle cam 16 and the throttle plate attached thereto, to achieve a desired engine operating condition, for example, a desired speed.

Figure 2:
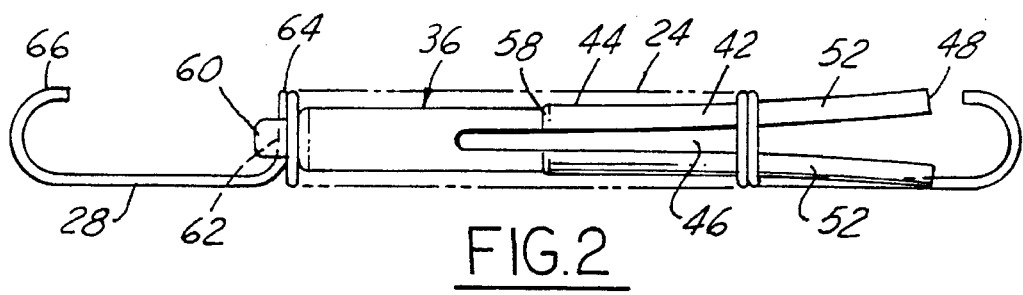
FIG. 2 is a top view of an internal damper according to a preferred embodiment of the present invention shown mounted in an accelerator return spring.
Figure 3:
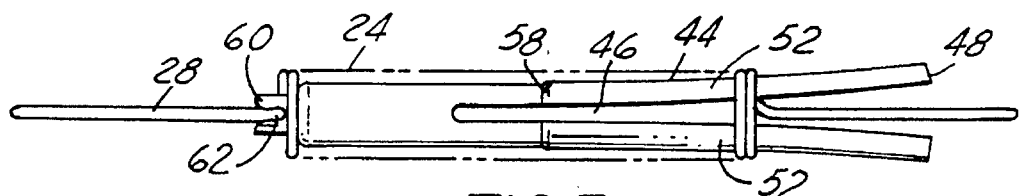
FIG. 3 is a side view of a damper shown in FIG. 2.
Figure 4:
FIG. 4 is an enlarged view similar to FIG. 2 and showing contacts between the accelerator return spring and the damper mounted therein.

At certain engine speeds, the "pedal buzz" phenomenon described above may occur. An internal spring damper 36 (FIG. 1) according to the present invention, however, will prevent such an occurrence. As better seen in FIG. 2, the damper 36 fits within an internal space 38 (FIG. 5) formed by the inner diameter 40 of the spring 24. The damper 36 is generally cylindrical and has a large segment 42 with an outer diameter 44 greater than the inner diameter 40 of the spring 24 so as to form a friction fit when inserted therein. Although the large segment 42 can be solid in cross-section, it preferably is partially or completely hollow in an axial direction, as seen in FIGS. 2–4. A hollow cross-section allows the damper 36 to better absorb vibrational energy from the spring 24.

Figure 6:
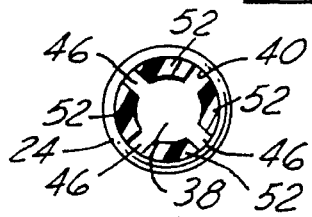
FIG. 6 is a cross-sectional view taken along line 6—6 of FIG. 4.
Figure 7:
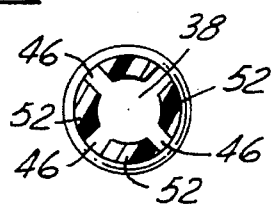
FIG. 7 is a cross-sectional view taken along line 7—7 of FIG. 4.
Figure 8:
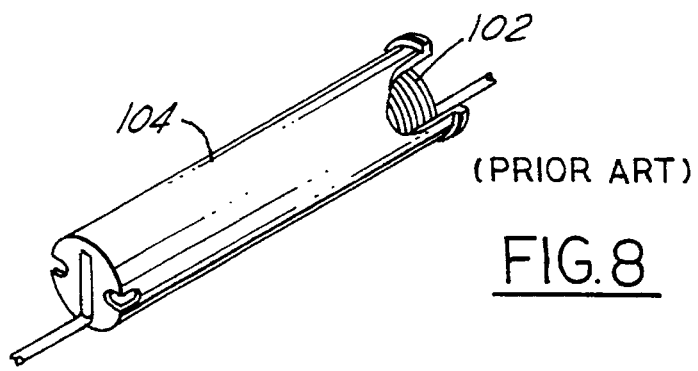
FIG. 8 is a perspective view of an externally mounted accelerator return spring damper.

In addition to being hollow, the large segment 42 preferably has longitudinal slits 46 extending axially from one end 48 of the damper 36 toward the other end 50 to provide additional energy absorbing capability. At least one slit is necessary, and preferably the damper 36 has four slits 46 which define four tangentially spaced, flexible fingers 52 (FIG. 9) which compress radially inward to allow a friction fit with the inner diameter 40 of the spring 24 (FIGS. 6–7). The radial thickness of the large segment 42, the circumferential width of the slits 46, and the length of the slits 46 can be changed to vary the energy absorbing capability of the damper 36 to meet spring 24 and engine requirements. The fingers 52 absorb energy by flexing radially, inwardly and outwardly, upon vibration of the spring 24. The large segment 42 with fingers 52 as described provides a variable diameter damper 36 which expands and compresses so as to fit the inner diameter 40 of the spring 24.

Figure 5:
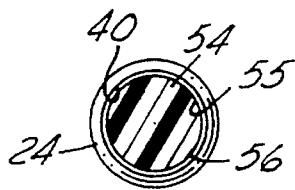
FIG. 5 is a cross-sectional view taken line 5—5 of FIG. 4.

Referring now to FIGS. 4 and 9, the end 50 of the damper 36 opposite the fingers 52 preferably has a small segment 54 with an outer diameter 55 less than the inner diameter 40 of the spring 24 to facilitate alignment of the damper 36 into the internal space 38 of the spring 24. As seen in FIG. 5, this diameter difference results in a clearance 56 between the small segment 54 and the inner diameter 40 of the spring 24. The small segment 54 is separated from the large segment 42 by a transition section 58 having a gradually varying diameter between that of the large segment 42 and the small segment 54 (FIG. 4). In cross-section, the small section can be solid along its entire length, or it can be partially solid with a hollow portion into which the slits 46 and fingers 52 extend, as seen in FIGS. 4 and 9. Other variations are possible, including a fluted small segment 54. While the invention has been described in terms of a single large segment 42, the damper 36 may have more than one large segment 42 separated by small segments.

Still referring to FIG. 4, attachment of the damper 36 to the spring 24 is accomplished by a clip 60 on end 50 of the small segment 54. The clip 60 attaches to a catch 62 on one end 28 of the spring 24. The catch 62 preferably comprises a winding 64 on end 28 turned through the spring 24 diameter (FIGS. 4 and 10). The wiring then turns in an axial direction to form a hook 66.

The various parts of the damper 36, including the clip 60, the fingers 52, and the cylindrical small and large segments 54, 42 can be injection molded into an integral piece, preferably of a durable, heat-resistant material, such as nylon.

The damper 36 is easily inserted into the spring 24 by aligning the clip 60 end with the internal space 38 on the end of the spring 24 opposite the catch 62. The damper 36 is then grasped by the fingers 52 and pushed into the internal space 38 with the clip groove 68 oriented to attach with the catch 62. The fingers 52 compress radially inwardly to form a friction fit with the inner diameter 40 of the spring 24 as the transition section 58 enters the spring 24. The fingers 52 preferably extend beyond the end of the spring 24 when the damper 36 is attached thereto, as seen in FIGS. 2 and 3, to permit an assembler to grasp and guide the damper 36. The extension of the fingers 52 also provides versatility for use with longer or shorter springs, while the radial flexibility of the fingers 52 allows use with varying diameter springs.

Although the preferred embodiment of the present invention has been disclosed, various changes and modifications may be made without departing from the scope of the invention as set forth in the appended claims.

I claim:

1. An accelerator return spring assembly for biasing an automotive throttle valve of an internal combustion engine to a predetermined position, the assembly comprising;
   a tension coil spring having a first end attached to a throttle cam of the throttle valve and a second end attached to the engine, the coil spring defining an internal space therewithin; and
   a generally cylindrical damping member within the internal space of the coil spring for damping vibrations thereof, the damping member having at least one variable diameter segment which forms a friction fit with the inner diameter of the spring, at least one small segment with an outer diameter less than the inner diameter of the coil spring, and four circumferentially spaced longitudinally extending slits defining four tangentially spaced fingers.

2. An assembly according to claim 1 wherein the at least one variable diameter segment of the damping member has the slits therein so that the fingers compress radially inward upon insertion into the internal space of the spring.

3. An accelerator return spring assembly for biasing an automotive throttle valve of an internal combustion engine to a predetermined position, the assembly comprising:
   (1) a tension coil spring having a first end attached to a throttle cam of the throttle valve and a second end attached to the engine, the coil spring defining an internal space therewithin; and
   (2) a generally cylindrical damping member within the internal space of the coil spring, the damping member having:
      (a) a first segment with an outer diameter less than the inner diameter of the coil spring;
      (b) a second segment having a hollow cross-section and an outer diameter greater than the inner diameter of the coil spring; and
      (c) a plurality of longitudinally extending slits in the second segment defining a plurality of tangentially spaced fingers so that the fingers compress radially inward upon insertion into the internal space of the spring.

4. An assembly according to claim 3 wherein a portion of the first segment is partially hollow.

5. An assembly according to claim 4 wherein the slits and the plurality of fingers extend longitudinally through the second segment into the first segment.

6. An assembly according to claim 5 wherein the damping member has a transition segment between the first segment and the second segment with a gradually varying diameter between the diameter of the first segment and the diameter of the second segment.

7. An assembly according to claim 6 wherein the first segment has a clip thereon for attaching to one of the first end and the second end of the spring.

8. An assembly according to claim 7 wherein the clips the fingers, and the cylindrical damping member are an integral injection molded piece.

9. An assembly according to claim 8 wherein the integral piece is made from a heat-resistant nylon material.

10. An accelerator return spring assembly for biasing an automotive throttle valve of an internal combustion engine to a predetermined position, the assembly comprising;

(1) a tension coil spring having a first end attached to a throttle cam of the throttle valve and a second end attached to the engine, the coil spring defining an internal space therewithin; and (2) a generally cylindrical damping member within the internal space of the coil spring, the damping member having a plurality of longitudinally extending slits therein defining a plurality of tangentially spaced fingers so that the fingers compress radially inward upon insertion into the internal space of the spring to form a friction fit therewith.

* * * * *